(12) United States Patent
Kiesel et al.

(10) Patent No.: US 7,310,153 B2
(45) Date of Patent: Dec. 18, 2007

(54) USING POSITION-SENSITIVE DETECTORS FOR WAVELENGTH DETERMINATION

(75) Inventors: Peter Kiesel, Palo Alto, CA (US); Oliver Schmidt, Palo Alto, CA (US); Oliver Wolst, Walzbachtal (DE)

(73) Assignee: Palo Alto Research Center, Incorporated, Palo Alto, CA (US)

( * ) Notice: Subject to any disclaimer, the term of this patent is extended or adjusted under 35 U.S.C. 154(b) by 216 days.

(21) Appl. No.: 10/922,870

(22) Filed: Aug. 23, 2004

(65) Prior Publication Data

US 2006/0039009 A1    Feb. 23, 2006

(51) Int. Cl.
*G01B 9/02* (2006.01)
(52) U.S. Cl. ...................... 356/519; 356/454
(58) Field of Classification Search ............... 356/519, 356/454, 480, 506; 372/29.022
See application file for complete search history.

(56) References Cited

U.S. PATENT DOCUMENTS

| | | | |
|---|---|---|---|
| 2,708,389 A | 5/1955 | Kavanagh | |
| 3,973,118 A | 8/1976 | LaMontagne | |
| 4,957,371 A | 9/1990 | Pellicori et al. | |
| 5,144,498 A * | 9/1992 | Vincent | 359/885 |
| 5,166,755 A | 11/1992 | Gat | |
| 5,784,507 A * | 7/1998 | Holm-Kennedy et al. | 385/31 |
| 5,825,792 A | 10/1998 | Villeneuve et al. | |
| 6,034,981 A | 3/2000 | Kim | |
| 6,295,130 B1 | 9/2001 | Sun et al. | |
| 6,621,837 B2 | 9/2003 | Le Gall et al. | |
| 6,630,999 B2 | 10/2003 | Shroder | |
| 6,639,679 B2 * | 10/2003 | Frojdh | 356/454 |
| 6,763,046 B2 | 7/2004 | Baillargeon et al. | |
| 6,785,002 B2 | 8/2004 | Zarrabian et al. | |
| 6,801,553 B2 | 10/2004 | Imahi et al. | |
| 6,870,149 B2 | 3/2005 | Berezin | |
| 2001/0007501 A1 | 7/2001 | Frojdh | |
| 2002/0131047 A1 * | 9/2002 | Zarrabian et al. | 356/454 |
| 2003/0161024 A1 * | 8/2003 | Zhang et al. | 359/260 |
| 2004/0032584 A1 | 2/2004 | Honda et al. | |
| 2004/0228375 A1 * | 11/2004 | Ghosh et al. | 372/32 |
| 2007/0076210 A1 | 4/2007 | Kiesel et al. | |
| 2007/0145236 A1 | 6/2007 | Kiesel et al. | |
| 2007/0146888 A1 | 6/2007 | Schmidt et al. | |

FOREIGN PATENT DOCUMENTS

WO    WO 95/20144    7/1995

OTHER PUBLICATIONS

Spear et al. "Low noise position sensitive detector for optical probe beam deflection". Rev. Sci. Instrum. 67 (7), Jul. 1996.*

(Continued)

*Primary Examiner*—Samuel A. Turner
(74) *Attorney, Agent, or Firm*—Leading-Edge Law Group, PLC; James T. Beran

(57) ABSTRACT

A chip-size wavelength detector includes a film with laterally varying transmission properties and a position-sensitive detector. The film transmits a different wavelength as a function of lateral position across the film. The position of a spot of light transmitted through the film will shift, depending on the wavelength of the light. The shift is measured by the position-sensitive detector.

25 Claims, 13 Drawing Sheets

OTHER PUBLICATIONS

Schaefer et al, Accuracy of Position Detection Using a Position Sensitive Detector. IEEE, Transactions on Instrumentation and Measurement, Aug. 1998, pp. 914-919.*

Henry et al, Wavelength response of thin-film optical Position-Sensitive Detectors, J. Opt. A:Pure and Applied Optics, 2002, pp. 527-534.*

Koo, J.-Y., and Akamatsu, I., "A simple real-time wavemeter for pulsed lasers," Meas. Sci. Technol., vol. 2, 1991, pp. 54-58.

Hamamatsu Corporation, "Position Sensitive Detectors," printed from sales.hamamatsu.com on Aug. 25, 2006, 8 pages.

Wippich, M., and Dessau, K.L., "Tunable Lasers and Fiber-Bragg-Grating Sensors," The Industrial Physicist, Jun./Jul. 2003, pp. 24-27.

Othonos, A., and Kalli, K., "Fiber-Bragg Gratings—Fundamentals and Applications in Telecommunications and Sensing," Artech House, Norwood, MA, 1999, pp. 304-330.

Notice of Allowance and Fee(s) Due and attached papers for U.S. Appl. No. 11/315,387, mailed Jun. 20, 2007, 23 pages.

Notice of Allowance and Fee(s) Due and attached papers for U.S. Appl. No. 11/316,438, mailed Jul. 6, 2007, 20 pages.

Communication with extended European Search Report in EPO Application No. 05255106.6-2217, dated Dec. 22, 2005, 8 pages.

Communication pursuant to Article 96(2) EPC Application No. 05255106.6-2217, dated Oct. 5, 2006, 1 page.

Letter to European Patent Office relating to Application No. 05255106.6-2217, dated Feb. 7, 2007, 10 pages.

* cited by examiner

USING POSITION-SENSITIVE DETECTORS FOR WAVELENGTH DETERMINATION

BACKGROUND OF THE INVENTION

1. Field of Invention

This invention is directed to techniques that use position-sensitive detectors, such as in measuring wavelength of light, in measuring wavelength shift of light, or in producing a chip-size wavelength detector.

2. Description of Related Art

Spectrometers and wavelength shift detectors are widely used in scientific, academic and industrial applications to measure the various wavelengths of multi-colored light. Known spectrometers use a wavelength dispersive means, such as a prism or grating, to separate components of the multi-colored light according to the wavelengths of the components. The intensity of the wavelength components is then measured by a photodetector.

Wavelength shift detectors may also use wavelength dispersive means. However, instead of measuring intensity as a function of wavelength, they generally measure a shift in wavelength of a single frequency source away from a nominal value. Often spectrometers are used to measure the wavelength shift, however the wavelength resolution is typically poor, on the order $10^{-2}$ nm. For applications where high wavelength resolution is needed, a Mach-Zehnder type wavelength meter is sometimes used.

FIG. 1 shows an exemplary view of a known embodiment of a spectrometer apparatus disposed to measure the intensity of light 11 produced by a source 10. Source 10 outputs a beam of multi-colored light which is imaged by an imaging lens 20 onto entrance slits 30 of a spectrometer 40. The slits 30 are used to define the input trajectory of the light upon the optical elements of the spectrometer 40. The intensity of the light is measured by a photosensitive detector 50, for example, at an exit aperture of the spectrometer 40.

FIG. 2 shows the internal and external components of the spectrometer apparatus of FIG. 1 in further detail. The slits 30 admit the beam of light 11 containing at least two wavelength components, $\lambda_1$ and $\lambda_2$. For clarity, only the central ray of the beam of light 11 and no optical components within the spectrometer are shown in FIG. 2. The beam of light 11 is incident upon a wavelength dispersive means 35, shown in FIG. 2 as a grating, which reflects the light with a different phase angle, according to the portion of the grating that reflects the light. The light having a wavelength and phase angle such that the wavefronts constructively interfere at the detector, are measured by the detector 50 as having a given intensity. Therefore, the detector 50 may record the intensity as a function of wavelength, thereby producing the spectrum of the source 10.

According to FIG. 2, the photosensitive detector 50 may have a plurality of discrete photosensitive elements, such as a detector array or charge-coupled device (CCD) array. Each photosensitive element may be independently accessible by a data collection apparatus, such as a computer.

While FIG. 2 shows the wavelength dispersive means as being a reflective grating, one skilled in the art will understand that other wavelength dispersive means may also be used in the spectrometer to separate the components of light according to wavelength. For example, a prism will refract the various components at a different angle depending on the wavelengths of the components. However, regardless of the means used to disperse the wavelength components of the multi-colored light, it will be appreciated that all spectrometers must have some significant distance between the wavelength dispersive means 35 and the optical detector 50, in order to give the components a measurable separation.

Another device which can separate wavelength components from a multi-colored light is a Fabry-Perot etalon. An exemplary Fabry-Perot etalon is shown in FIG. 3. The Fabry-Perot etalon 70 is composed of two reflective films 72 and 76, which are applied to the front and rear surfaces of a transmissive cavity 74. Light incident on the Fabry-Perot etalon 70 will be transmitted if its wavelength is such that an integer number of half-wavelengths can be fit inside the thickness d of the transmissive cavity 74. In this case, light having this wavelength will be transmitted, whereas light of other wavelengths will be reflected. The reflectivity spectrum of the Fabry-Perot etalon 70 is shown in FIG. 4. A dip 78 in the reflectivity spectrum occurs at the transmission wavelength of the Fabry-Perot etalon 70. Fabry-Perot etalons are not, in general, used in spectrometers or wavelength shift detectors, because they are not tunable, and thus cannot produce a spectrum, or measure different wavelengths.

The requirement for a distance between the wavelength dispersive means 35 and the optical detector 50 requires a spectrometer to be a relatively large, bulky device. The distance then also requires the spectrometer to undergo frequent alignment and calibration to adjust the angle of the grating or prism relative to the slits and detector, in order to optimize performance. Furthermore, the distance between the optical elements and the detector in a conventional spectrometer makes the spectrometer sensitive to vibrations, so that it must be used in a stable, well-controlled environment.

One approach to making a spectrometer which does not need to be aligned, and is compact and robust, is disclosed in U.S. Pat. No. 5,166,755 to Gat. Gat describes a spectrum resolving sensor containing an opto-electronic monolithic array of photosensitive elements, and a linearly variable optical filter that is permanently aligned with the array. The linear variable filter is a substrate covered with variable thickness coatings formed into a wedge shape.

SUMMARY OF THE INVENTION

However, the device described in Gat suffers from using relatively expensive components, and having rather poor wavelength discrimination capabilities.

This invention provides a chip-size spectrometer and wavelength shift detector which measures a wavelength by using a position-sensitive detector coated with a material which has laterally varying transmission properties. As used herein, the term "position-sensitive detector" connotes a homogeneous device which generates an output which is proportional to the location of a light spot upon the photosensitive surface of the detector. The output of the position-sensitive detector may be two currents, whose normalized difference is proportional to the location of the light spot on the detector. The wavelength detector may be used to measure the wavelength of a monochromatic source or to determine precisely a wavelength shift of the source.

The position-sensitive photodetector may be based on a continuous, homogeneous, non-discrete photosensitive medium, as distinct from an array of discrete photosensitive elements. Such detectors are far less expensive than detectors made from arrays of photosensitive elements. This is particularly true for any wavelength range where Si-based devices cannot be used. In addition, they have inherently better position resolution than arrays, for which the position resolution is limited by the size of the discrete photosensitive elements making up the array. The resolution of a position-sensitive detector is only limited by the accuracy with which a differential current can be measured. The typical resolution of position-sensitive detectors is less than 0.1 µm.

Exemplary embodiments of a coating with laterally varying transmission properties may be a Fabry-Perot cavity with a laterally varying thickness (e.g., a wedge-shaped etalon) or a cavity with laterally varying index of refraction. The wedge-shaped etalon has a wedge-shaped transmissive cavity, having a thickness that varies across the surface of the detector and being positioned adjacent to at least one reflective layer. The wedge-shaped etalon has a transmission function that varies across the surface of the detector according to the thickness of the transmissive cavity. Therefore, a shift in the wavelength of the input light causes a shift in the position of the transmitted spot on the photosensitive detector. Use of a wedge-shaped etalon substantially improves the wavelength selectivity over a linear variable filter, such as described in Gat.

The reflective layers on the transmissive cavity may be a plurality of thin films, with thicknesses and indices of refraction that are chosen to form a distributed Bragg reflector (DBR). Using highly reflective Bragg reflectors further improves the wavelength selectivity of the wedge-shaped etalon.

The dielectric Fabry-Perot cavity with varying index of refraction may be a film of material having uniform thickness, but varying material composition across the lateral dimension of the film. This can be, for instance, a Fabry-Perot cavity comprising a uniformly thick AlGaAs film with laterally varying Al content.

Various exemplary embodiments of the invention can be used to measure the wavelength or the wavelength shift of a single frequency light source. To measure a wavelength shift, a first signal indicative of a location of a first detected spot of light at a first wavelength is measured, and compared to a second signal indicative of a location of a second detected spot of light at a shifted wavelength, thereby producing a measurement of the wavelength shift between the two signals from the light source. The wavelength shift can be determined by a differential analog output signal which is proportional to the wavelength shift, and independent of light intensity.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 5:
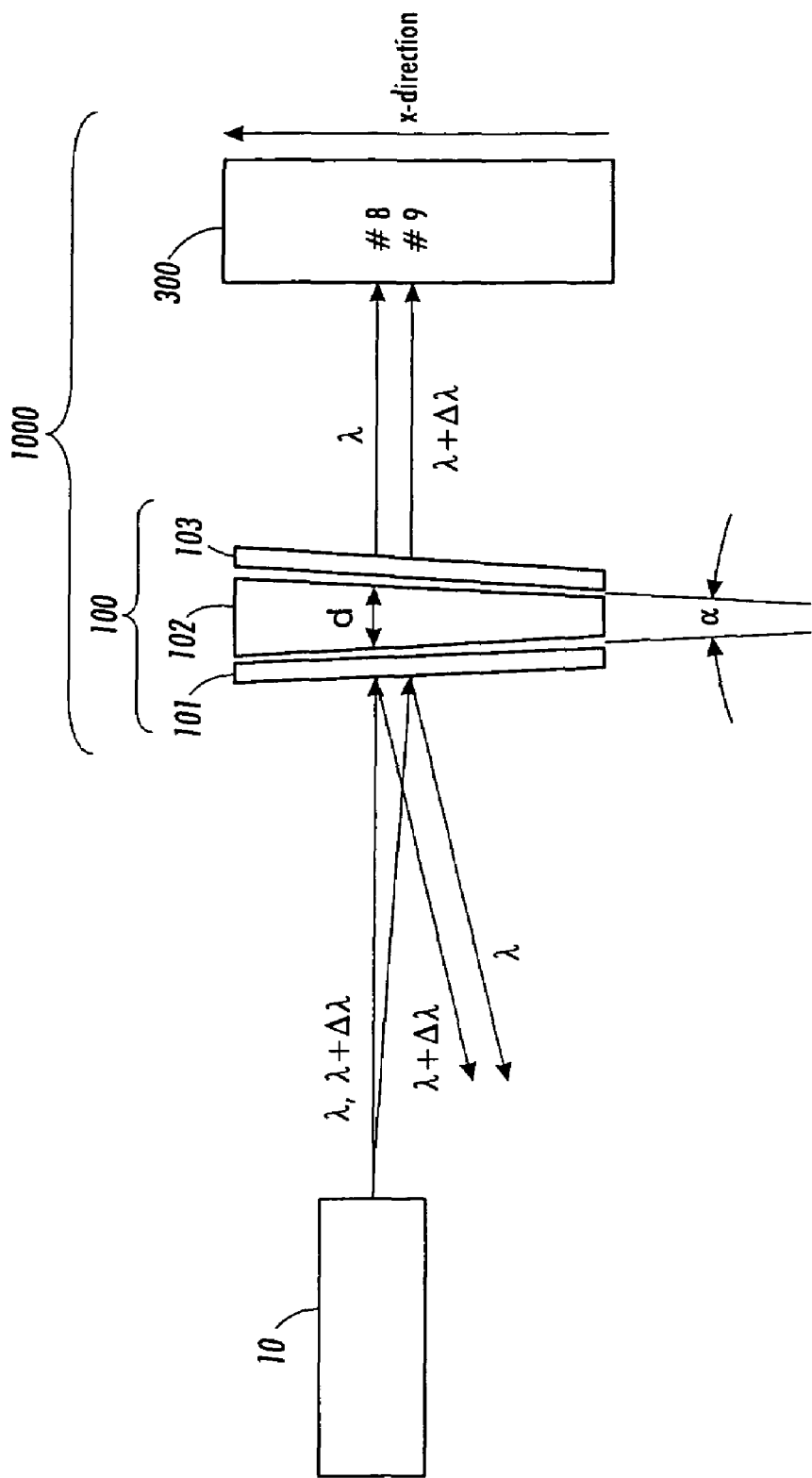
FIG. 5 is a diagram of a first exemplary embodiment of a chip-size wavelength detector according to this invention.

FIG. 5 shows a first exemplary embodiment of the chip-size wavelength detector 1000, according to this invention. As shown in FIG. 5, the chip-size wavelength detector 1000 includes two components, a film with laterally varying transmission properties 100 and a position-sensitive detector 300. The wavelength detector 1000 may be used to determine the absolute wavelength of a monochromatic source, or it may be used to measure a wavelength shift of a source away from a nominal wavelength.

The position-sensitive detector 300 may be a device which outputs a signal (e.g., a normalized current difference) which is proportional to the location of a light spot on the surface of the detector. For example, the position-sensitive detector 300 will output a different signal level, depending on whether a light spot falls on location #8 or location #9 on the position-sensitive detector 300.

The film with laterally varying transmission properties may be variable thickness etalon 100, which includes at least three sub-components, a wedge-shaped transmissive cavity 102, and two reflective films 101 and 103. Therefore, the three films 101, 102 and 103 form a wedge-shaped Fabry-Perot etalon. The wedge-shaped transmissive cavity 102 has a thickness d which varies as a function of the distance x along the lateral dimension of the wedge. Therefore, the wedge-shaped etalon 100 will transmit different wavelengths λ as a function of lateral distance x. In particular, the transmitted wavelength is $$k\lambda(x) = 2nd(x) \quad (1)$$

where n is the index of refraction of the material of the transmissive cavity, and λ is an integer.

The variable thickness etalon 100 comprising the wedge-shaped transmissive cavity 102 and the two reflecting films 101 and 103, shown in FIG. 5 may be disposed adjacent to a position-sensitive detector 300. A source 10 may output, at different times, light of wavelength λ and wavelength-shifted light of wavelength λ+Δλ. When light source 10 outputs light of wavelength λ, at a certain location in the wedged etalon 100, the wavelength λ is transmitted through the etalon 100, and impinges upon a location, for example, location indicated by #8, on the position-sensitive detector 300. If the light source 10 outputs wavelength-shifted light of wavelength λ+Δλ, the wavelength-shifted light λ+Δλ is reflected from the etalon 100 at the position corresponding to location #8. However, at another point corresponding to the location #9, the wavelength-shifted light λ+Δλ is transmitted through the etalon 100, whereas wavelength λ is reflected. Therefore, the output of the position-sensitive detector will correspond to the illumination of location #8 when light comprising wavelength λ is incident on the chip-size wavelength detector 1000. When light comprising a component having wavelength λ+Δλ is incident on chip-size wavelength detector 1000, the position-sensitive detector 300 will output a signal corresponding to the illumination of location #9.

Figure 6:
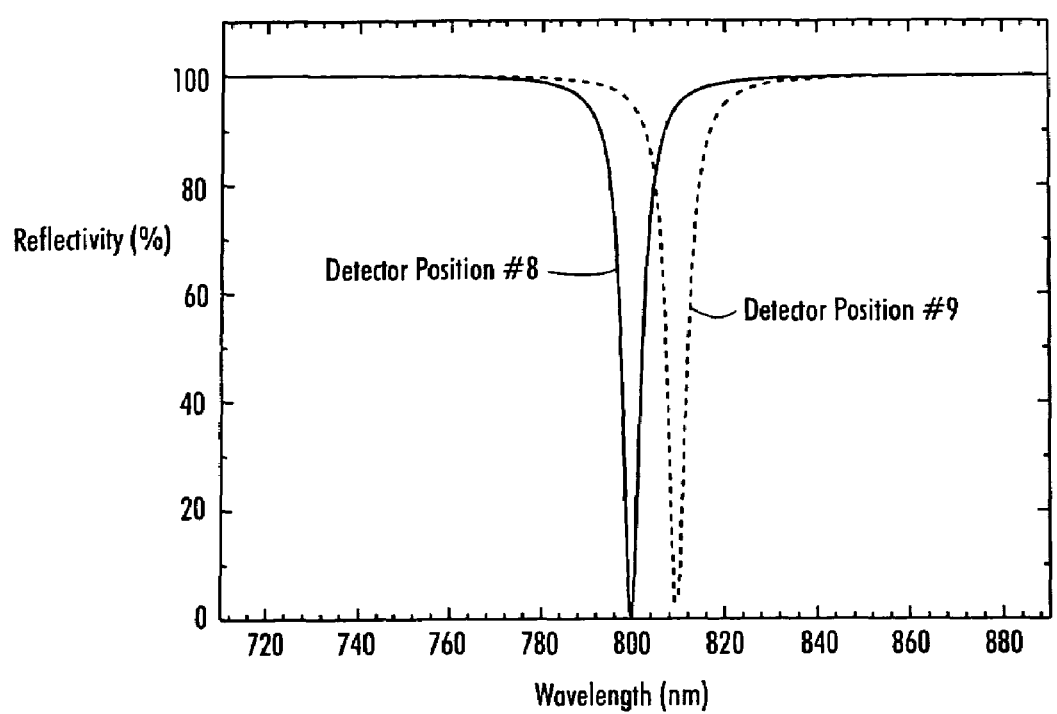
FIG. 6 is a schematic plot of the reflectivity spectrum of the wedge-shaped etalon of FIG. 5.

FIG. 6 shows an exemplary ideal reflectivity spectrum for the variable thickness etalon 100 of FIG. 5. According to FIG. 6, all wavelengths except for the transmission wavelength are reflected with nearly 100% efficiency, whereas wavelengths at or near the transmission wavelength are transmitted with an efficiency of nearly 100%. For example, as shown in FIG. 6, at a first position corresponding to location #8 on the variable thickness etalon 100, and at a first wavelength of about 800 nm, (λ), the reflectivity of the variable thickness etalon 100 is nearly zero, such that nearly 100% of the light intensity at λ is transmitted through the variable thickness etalon 100. However the reflectivity for light at a wavelength of about 810 nm (λ+Δλ) is nearly 100%, such that essentially all of the light at λ is transmitted, whereas virtually all of the light at λ+Δλ is reflected. However, at a second, adjacent position corresponding to location #9 in the optical film 100, the film 100 transmits nearly all of the light at 810 nm (λ+Δλ) and reflects nearly all of the light at the wavelength of λ. Therefore, obtaining a signal from position-sensitive detector proportional to position #8 indicates the presence of light having a wavelength of λ, obtaining a signal from the position-sensitive detector proportional to position #9 indicates the presence of light having a wavelength of λ+Δλ. Measuring the displacement between location #9 and location #8, gives a measure of the wavelength shift Δλ, according to a previously obtained calibration curve, as described further below.

Figure 7A:
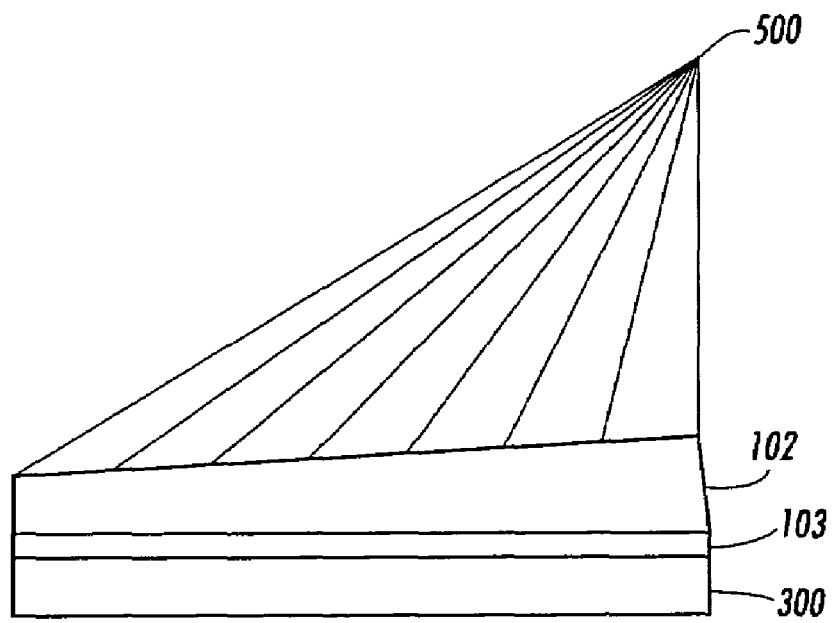
FIG. 7a is a schematic diagram illustrating a manufacturing method for making the wavelength detector of FIG. 5.

FIG. 7a shows a schematic diagram of a manufacturing setup which can be used to produce the wedged transmissive cavity 102 of wedged etalon 100 of FIG. 5. In this manufacturing setup, the wedged transmissive cavity 102 and reflectors 101 and 103 are deposited directly over the surface of the position-sensitive detector 300, using the position-sensitive detector 300 as a substrate. Alternatively, the wedged transmissive cavity and lower and upper reflectors 101 and 103 may be deposited on a transparent substrate, which is subsequently assembled onto the position-sensitive detector 300.

The thickness of the wedged transmissive cavity 102 may be made variable, by displacing the position-sensitive detector 300 away from the location which would correspond to the symmetric, shortest distance between the position-sensitive detector 300 and a source 500 of the deposition species. (The symmetric, shortest distance position would have the source 500 placed midway between the ends of the position-sensitive detector 300, and with the position-sensitive detector 300 oriented in a plane normal to the direction of the source 500 from the position-sensitive detector 300.) An exemplary orientation of the position-sensitive detector 300 with respect to the source 500 is shown in FIG. 7a.

Since the portion of the position-sensitive detector 300 which is closer to the source 500 intercepts a larger flux of the deposited species, it forms a thicker film over these regions than the region located further away from the source 500. In a molecular beam epitaxy (MBE) system, this configuration can easily be achieved by stopping the wafer rotation during the growth of the cavity. In an alternative embodiment of the manufacturing setup usable for forming the transmissive cavity 102, the position-sensitive detector 300 may also be placed at an angle relative to the normal trajectory of the deposited species on the position-sensitive detector 300. For either embodiment, the angle or the placement of the photosensitive detector is chosen to form a wedge of the appropriate angle. In the exemplary embodiments described below, the angle of the wedge was less than $10^{-4°}$.

Since typical angles are so small it is more suitable to specify the resulting shift of the transmission wavelength for a given lateral movement across the film. For example, with respect to FIG. 7c, described below, this wavelength shift was about 30 nm per cm, which corresponds to a wedge angle of about $2 \times 10^{-4°}$. This Fabry-Perot coating with wedged GaAs cavity was fabricated with a conventional molecular beam epitaxy system by simply stopping the substrate rotation during growth of the cavity. In a conventional deposition for fabricating $SiO_2/TiO_2$, the location (angle with regard to normal incidence and/or of center displacement) for placing the substrate (e.g., the position sensor) can be chosen within a wide range. This allows the fabrication coating with small (for example, less than 1 nm per cm) or large (for example, 100 nm per cm) lateral shift of the transmission wavelength depending on the application. The proper angle for deposition of the material may be determined experimentally, by depositing the wedged film and thereafter measuring its transmission properties.

Other methods may also be used to fabricate the variable thickness optical film 100, such as using a shadow mask or a temperature gradient to vary the deposition rate of the wedged film 102 over the surface of the position-sensitive detector 300.

Figure 7B:
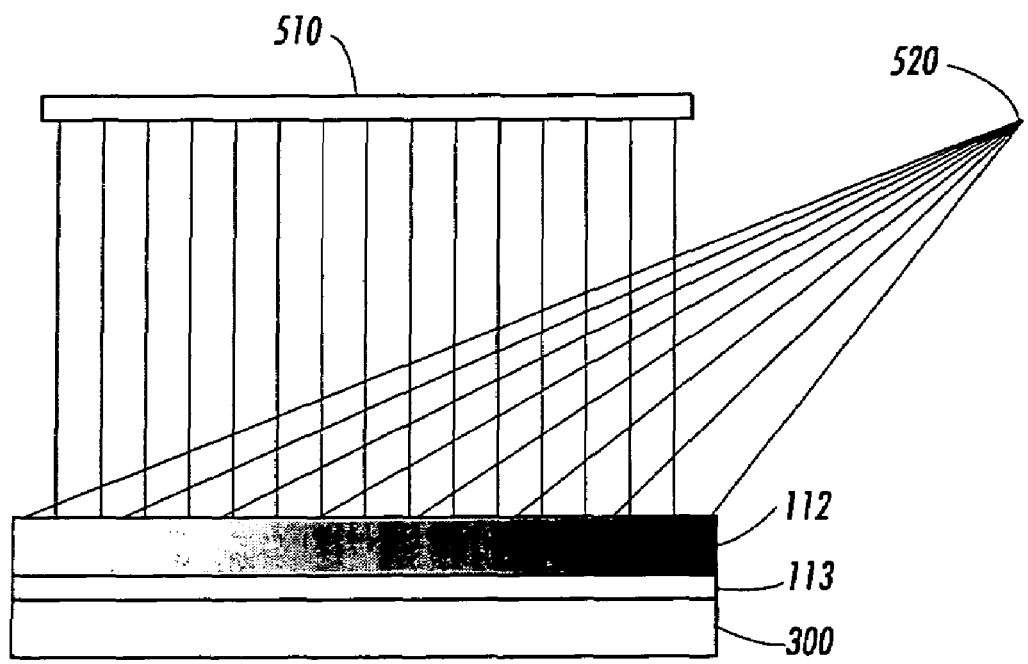
FIG. 7b is a schematic diagram illustrating a manufacturing method for making a wavelength detector with a laterally varying index of refraction.

The key property of the film is that the optical thickness has to be laterally varying. This can be achieved by a laterally varying thickness of the cavity or/and by a lateral variation of the refractive index e.g., by varying the material composition of the cavity. Therefore, an alternative embodiment of the film of FIG. 5 is an etalon with constant thickness but laterally varying refractive index. FIG. 7b shows a schematic diagram of the fabrication setup which can be used to produce such an etalon. In this setup, a source of alloy or dopant material 520 is disposed offset from the symmetric, shortest distance position to the position-sensitive detector 300, while a source of the deposited material 510 is disposed symmetrically above the position-sensitive detector 300. Therefore, the alloy or dopant source 520 changes the material composition of the uniformly thick film 112 laterally across the film 112. In various exemplary embodiments, the source of deposited material 510 may be GaAs or glass, and the alloy or dopant source may be Al or Ge. For instance, the index of refraction of unintentionally doped GaAs is 3.4 (at $\lambda=1$ μm) whereas it increases to 3.25 for AlGaAs with an Al content of 30%. In general, the choice of materials and the transmission properties of the film will depend on the application.

Figure 7C:
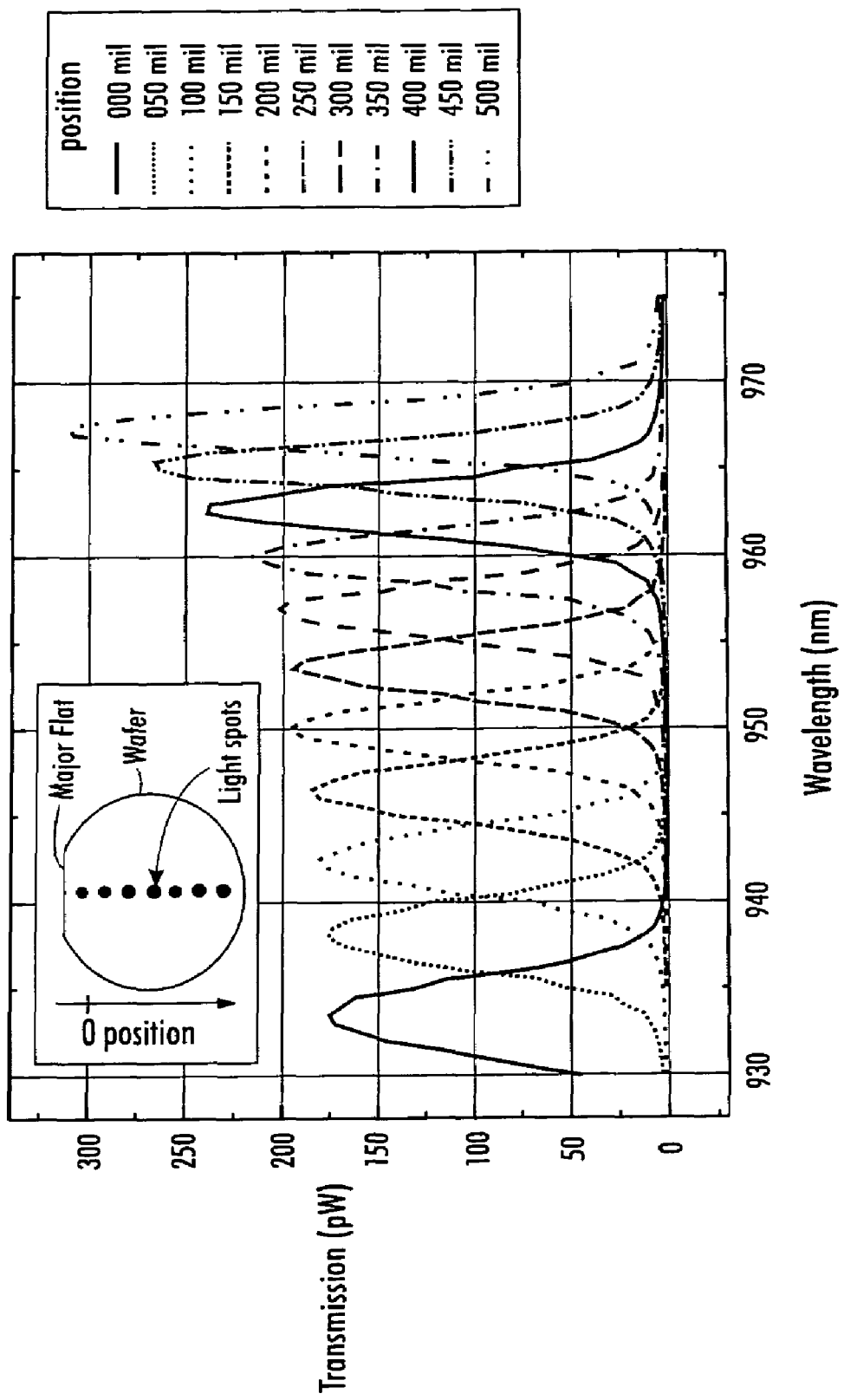
FIG. 7c is a measurement of the transmission properties of the Fabry-Perot cavity made by the setup of FIG. 7a, as a function of lateral position across the film.

FIG. 7c shows a measurement of the transmission properties of a AlGaAs/GaAs Fabry-Perot structure made by molecular beam epitaxy, in a manufacturing setup similar to that shown in FIG. 7a. The transmission of the film is a function of wavelength, and shows a distinct peak at a certain wavelength, for each position along the film. FIG. 7c shows the transmission characteristics for eleven such positions across the film. As shown in FIG. 7c, the peak of the transmitted wavelength changes from 932.5 nm to 967.5 nm, between position 1 and position 11. The distance between position 1 and position 11 is about 500 mils, so that the calibration for this device is about 0.07 nm per mil or about 3 nm per mm. Therefore, a wavelength shift of 0.01 nm is easily detectable on this device, as a lateral shift of the spot on the detector of about 3 μm.

The resolving power, also known as the finesse, of the etalon 100 may depend, in part, on the reflectivities of the front and rear surfaces 101 and 103. By improving the reflectivities of these films, the finesse of the etalon may be increased, thereby narrowing the full width half maximum of the reflectivity dip in the etalon. In order to improve the reflectivities of these films, the films 101 and 103 may be constructed using highly reflective distributed Bragg reflectors.

Bragg reflectors are multilayer structures consisting of alternating pairs of two dielectric materials with different refractive indices. Each layer of material x has a thickness of about:

$$d_x = \lambda/4n_x \qquad (2)$$

where $\lambda$ is the central wavelength of interest for which the filter should be optimized and $n_x$ is the refractive index of the material x at this wavelength. Unlike metallic reflectors, where the high reflectivity arises due to the extinction of light, Bragg reflectors exhibit small intrinsic absorption. The high reflectivity is caused by multiple-interference effects.

Distributed Bragg reflectors may be selected because the reflectivities of such multilayer films can be made almost arbitrarily high, depending on the number of pairs of films and the differences in their refractive indices. In order to achieve high reflectivities, the dielectric layers must have high purity (few defects) to prevent absorption, the thickness of the layers should be precisely controlled, and the interface between materials should be smooth to prevent light scattering. Vacuum film deposition techniques such as thermal evaporation or electron beam evaporation are usually used in industrial applications to achieve highly reflective distributed Bragg reflectors.

Figure 8:
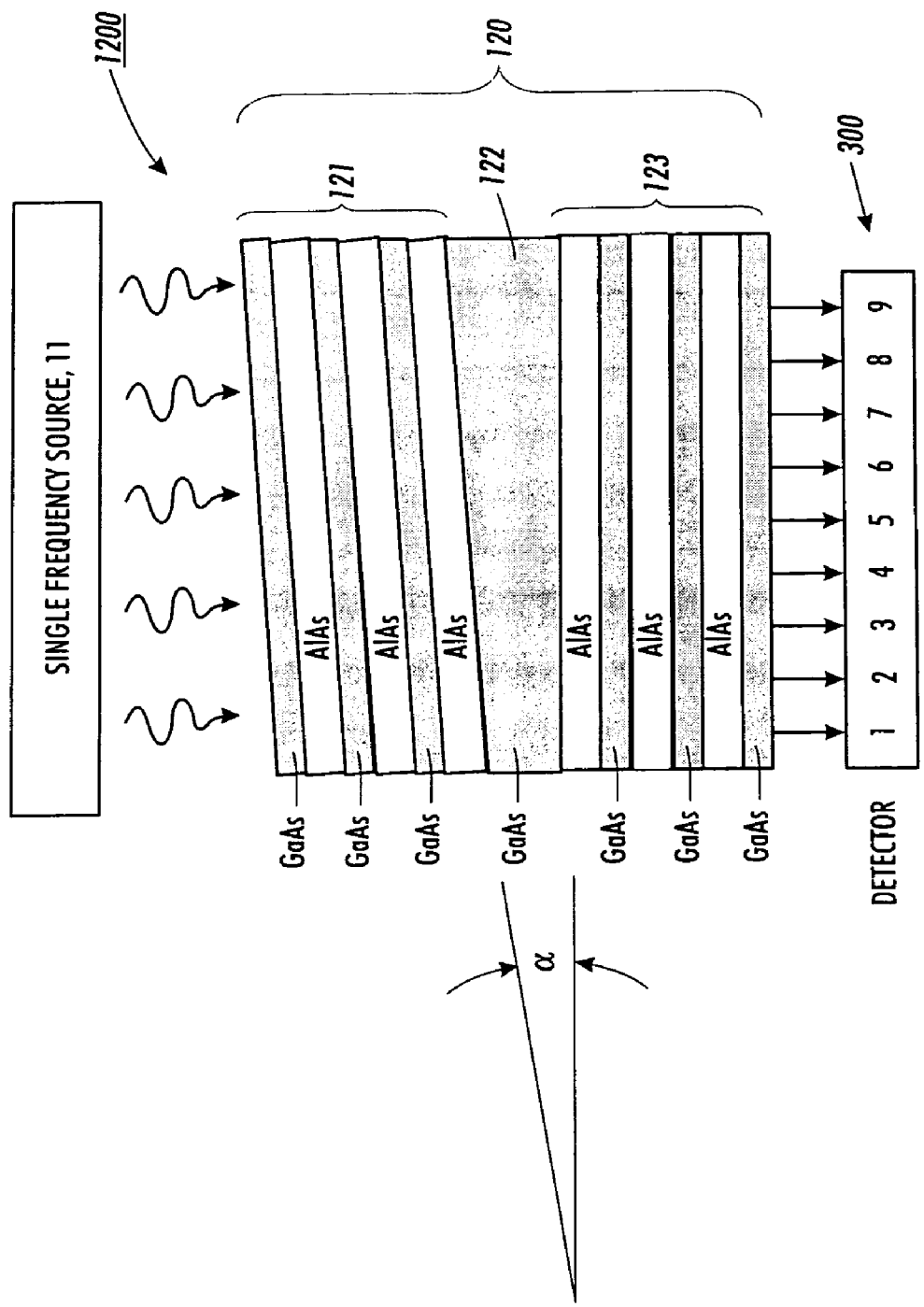
FIG. 8 is a schematic diagram of a second exemplary embodiment of a chip-size wavelength detector according to this invention.

A second exemplary embodiment of a chip-size wavelength detector 1200 is shown in FIG. 8. In this embodiment, the wedge-shaped etalon 120 comprises a wedge-shaped transmissive cavity 122, and two reflectors 121 and 123. The reflectors 121 and 123 are themselves multi-layer films, wherein the individual layers of the reflectors 121 and 123 are selected or formed with a thickness and an index of refraction to constitute a distributed Bragg reflector (DBR), as described above. The two reflectors 121 and 123, may be deposited with the wedge-shaped transmissive cavity 122, directly onto photosensitive detector 300. Alternatively, the two reflectors 121 and 123 and the wedge-shaped transmissive cavity 122 may be deposited on thin substrates and assembled together with the photosensitive detector 300 after formation.

The materials making up the distributed Bragg reflector films 121 and 123 may be alternating layers of gallium arsenide (GaAs) and aluminum arsenide (AlAs). To form the layers of this embodiment, the following films may be deposited by molecular beam epitaxy (MBE) on a GaAs substrate with the following thicknesses:

TABLE 1

| | | |
|---|---|---|
| Anti-Reflection Coating | $SiO_2$ | 120 nm |
| Top DBR mirror | 15 pairs of undoped GaAs/AlAs mirrors (GaAs on top) | GaAs: 67.0 nm<br>AlAs: 80.4 nm |
| Graded cavity | Undoped GaAs. Graded due to intrinsic thickness variation during growth. | GaAs: 268 nm |
| Bottom DBR mirror | 14.5 pairs of undoped AlAs/GaAs | AlAs: 80.4 nm<br>GaAs: 67.0 nm |
| Substrate | GaAs, bottom polished | 500 um |

Other alternative material deposition processes include metal organic chemical vapor deposition (MOCVD), electron-beam evaporation, and sputtering.

It should be understood that the materials and layer thicknesses given in Table 1 are exemplary only, and any of a number of different materials and thicknesses may also be selected depending on the application. For example, other exemplary embodiments may include the materials shown in Table 2.

TABLE 2

| Materials | Refractive index @ 950 nm | Transparency Range | Manufacturing technique, e.g. | Combinable with |
|---|---|---|---|---|
| GaAs | 3.55 | >870 nm | MBE, MOCVD | AlGaAs, AlAs |
| AlAs | 2.95 | >580 nm | MBE, MOCVD | |
| $SiO_2$ | 1.54 | 200 nm-7 um | Evaporation | $TiO_2$, $Ta_2O_5$ |
| $Al_2O_3$ | 1.65 | 200 nm-9 um | Evaporation | $TiO_2$, $Ta_2O_5$ |
| $TiO_2$ | 2.75 | 450 nm-11 um | Evaporation | |
| $Ta_2O_5$ | 2.09 | 300 nm-10 um | Evaporation | |
| GaN | 2.35 | >360 nm | MBE, MOCVD | AlGaN, AlN |
| AlN | 2.06 | >210 nm | MBE, MOCVD | |

According to the materials properties shown in Table 2 for these materials, some improvement in performance may be realized according to the anticipated results given in Table 3 for distributed Bragg construction using $SiO_2/TiO_2$.

TABLE 3

| Materials | Difference of refractive index @ 950 nm | Mirror pairs within a DBR mirror | Maximum Side band suppression | FWHM of transmission peak |
|---|---|---|---|---|
| GaAs/AlAs | 18% | 5 | $10^{-2}$ | 8.8 nm |
| GaAs/AlAs | 18% | 10 | $10^{-3}$ | 1.2 nm |
| $SiO_2/TiO_2$ | 56% | 5 | $10^{-4}$ | 1.7 nm |
| $SiO_2/TiO_2$ | 56% | 10 | $10^{-8}$ | 0.01 nm |

The wedge-shaped etalon 120 shown schematically in FIG. 8 was fabricated according to the above parameters in Table 1 using about 15 pairs of alternating GaAs and AlAs to form the films 121 and 123, and a wedge-shaped transmissive cavity 122 of undoped GaAs, nominally about 270 mu thick. Each GaAs layer of the DBR structures 121 and 123 is about 67 nm thick, with a refractive index of about 3.55, and each AlAs layer of the DBR structures 121 and 123 is about 80.4 nm thick with a refractive index of about 2.95. Therefore, based on equations (1) and (2), the transmission window of the wedge-shaped etalon was designed to be about 950 nm.

The wedge angle α of the wedge-shaped transmissive cavity 122 is determined based on the desired spectral range of the wedge-shaped etalon 120. The greater the angle α of the wedge-shaped-transmissive cavity 122, the larger the spectral range, but the lower the resolution of the chip-size wavelength detector 1200. Therefore, the choice of the wedge angle α will depend on the spectral range required of the chip-size wavelength detector 1200, and the resolution required, which will in turn depend on the dynamic range of the position-sensitive detector 300.

Figure 9:
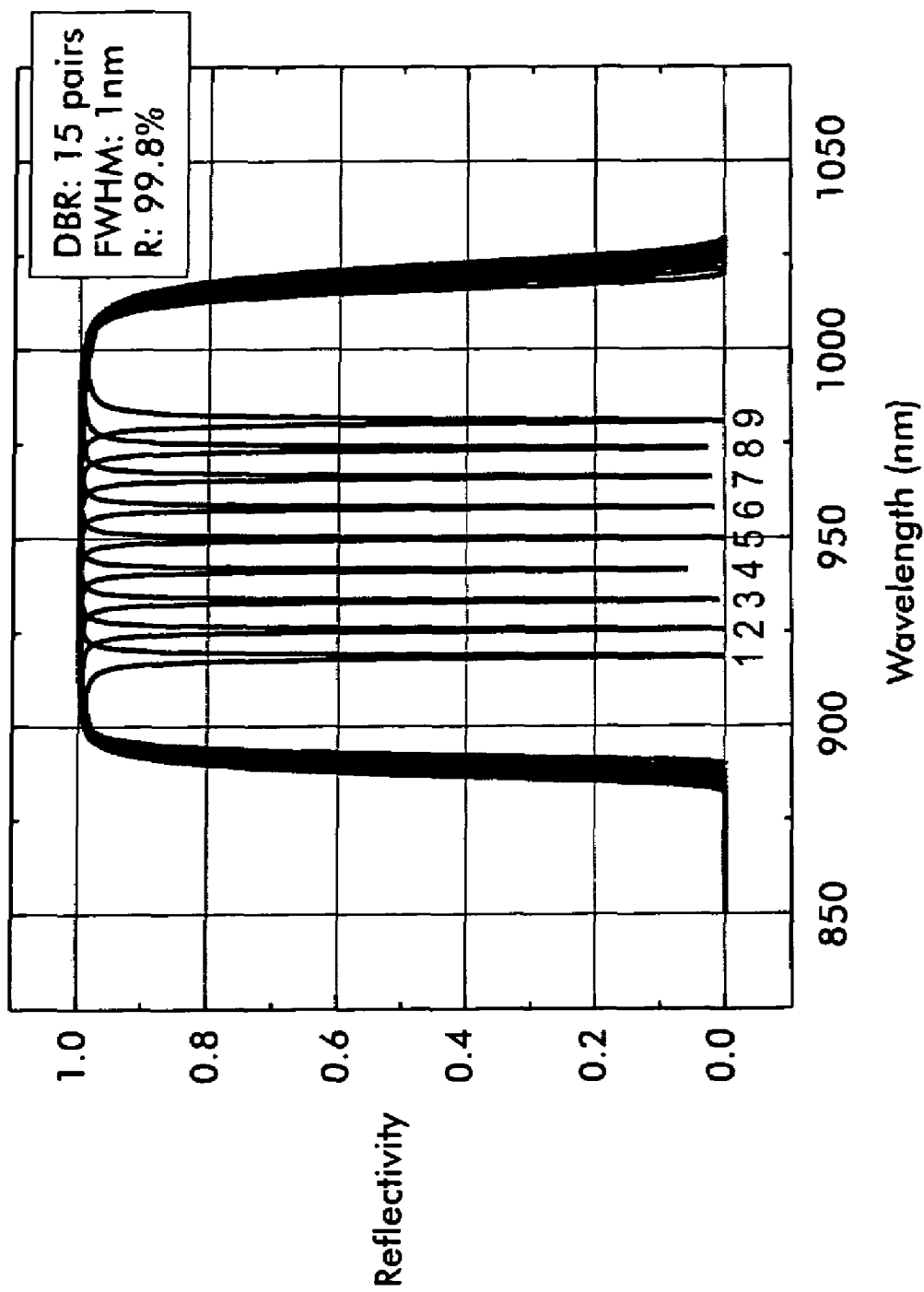
FIG. 9 is a schematic reflectivity spectrum of the dielectric Fabry-Perot structure with wedge-shaped cavity shown in FIG. 8.

The ideal transmission spectrum of the wedge-shaped etalon 120 with distributed Bragg reflectors 121 and 123, such as was shown in FIG. 8 is shown in FIG. 9. The data in FIG. 9 show calculated results for various points 1-9 along the wedge-shaped etalon 120. The overall full width half maximum of the transmission dips is about 1 nm, and the nominal reflectivity of the wedge-shaped etalon 120 is 99.8%. The resolution of the system depends strongly on resolution capability of the position-sensitive detector 300, the full width half maximum of the transmission dip, and on the peak shift per unit displacement of the wedge-shaped etalon 120. The smaller the full width half maximum and the peak shift, the better the resolution. However, the larger the full width half maximum and peak shift per unit displacement, the larger the spectral range which can be covered by the chip-size wavelength detector 1200.

The wedge-shaped etalon 120 producing the reflectivity curve shown in FIG. 9, spans a position-sensitive detector which is about 10 mm across. Based on these dimensions, the total spectral range shown in FIG. 9 of about 60 nm, and on equation (1) and the parameters given in Table 2 above, the wedge-shaped transmissive cavity 122 has a wedge angle α of less than about 0.0001 degrees, and a corresponding wavelength shift versus displacement of about 6 nm/mm. Such small wedge angles and even much smaller angles can be easily achieved with thin-film deposition techniques, such as molecular beam epitaxy (MBE).

Figure 10:
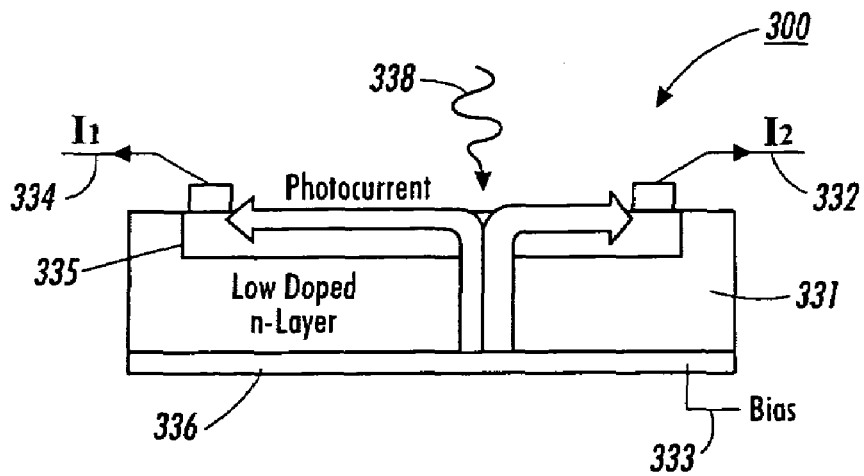
FIG. 10 shows an exemplary embodiment of a position sensor, usable in this invention.

FIG. 10 shows an exemplary embodiment of a position-sensitive detector 300 that may be used in the wavelength shift detector 1200. In the position-sensitive detector 300 of FIG. 10, a three-terminal semiconductor device is used to generate a signal which is proportional to the location of a light spot falling on the detector surface. The detector surface may be located between two output electrodes, and the differential current flowing from a bias electrode to each of the output electrodes may correspond to the position of the light spot on the sensor.

A position sensor of this type is the 1L10 manufactured by On-Trak Photonics, Inc. of Lake Forest, Calif. The position-sensitive detector 300 comprises an n-type silicon substrate 331 with two resistive layers separated by a p-n junction. The front side has an ion implanted p-type resistive layer 335 with two contacts or electrodes 332 and 334 at opposite ends. The back side has an ion implanted n-type resistive layer 336 which serves as the bias electrode 333 for the device. On a single axis position sensor, the electrodes 332 and 334 are placed at opposite ends of the p-type resistive layer 335. A light spot within the spectral range of silicon will generate a photocurrent which flows from an incident point 338 through the resistive layers 335 and 336 to the electrodes 332 and 334. The resistivity of the p-type resistive layer 335 is extremely uniform so the photocurrent generated at each electrode 332 and 334 is inversely proportional to the distance between the incident point 338 and the electrodes 332 and 334. The position-sensitive detector 300 may be 10 mm long, and may have a position sensitivity of better than about 0.1 μm.

In another exemplary embodiment, a five-terminal position-sensitive detector may be used, which can locate the position of the spot falling on the detector surface in two dimensions. In this embodiment, the detector surface can be located between the two pairs of electrodes on the front side of the position-sensitive detector and a single bias electrode on the back side. This position-sensitive detector may be used with a laterally varying transmissive film, wherein the film varies laterally in the two dimensions, for example, with a relatively steep gradient in one dimension and a shallower gradient in the other.

Although not shown in FIG. 10 for clarity, it will be understood by one of ordinary skill in the art that the position-sensitive detector 300 can be fabricated in an integrated circuit-type housing, which provides electrical connections via output pins to position-sensitive detector 300. The output pins can then be coupled electrically to a cable or wire, such that signals outputted by the position-sensitive detector 300 can be acquired by a data collection apparatus such as a computer. The differential read-out of the two currents of the position sensor can be achieved either by an integrated internal or external electronic circuit (e.g., an operational amplifier) or by a computer. Since such techniques are well known in the art, they are not depicted in FIG. 10, or described further herein.

Figure 11:
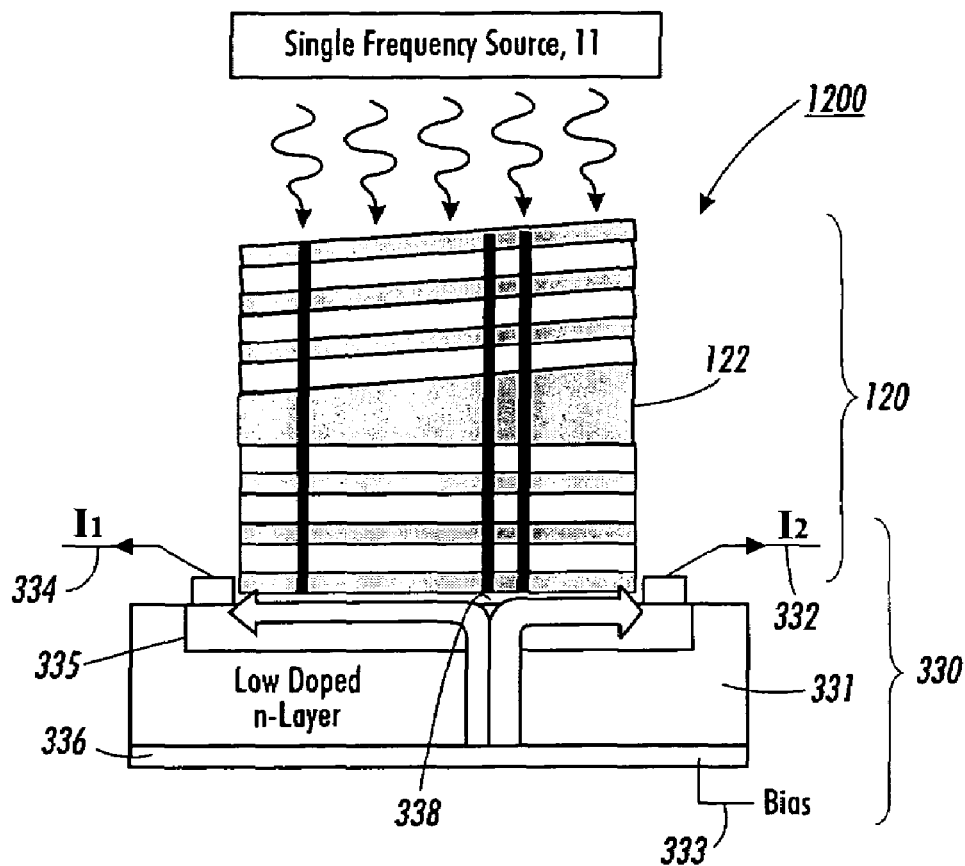
FIG. 11 shows the position sensor of FIG. 10 used in a third exemplary embodiment of a chip-size wavelength detector according to this invention.

FIG. 11 shows a third exemplary embodiment of a chip-size wavelength detector 1200 using the position sensor 300 of FIG. 10. FIG. 11 shows a wedge-shaped etalon 120 applied to the surface of the position-sensitive detector 300. The wedge-shaped etalon 120 is a distributed Bragg reflector/etalon stack similar to that shown in FIG. 8. The distributed Bragg reflector layers were composed of alternating layers of AlAs and GaAs, with a GaAs cavity, all deposited by molecular beam epitaxy. Because the peak transmission for a given wavelength will depend upon the width of the transmissive cavity 122 of the wedged Fabry-Perot etalon 120, the position of the maximum transmitted intensity will shift along the position-sensitive detector 300, as a function of wavelength.

Figure 12:
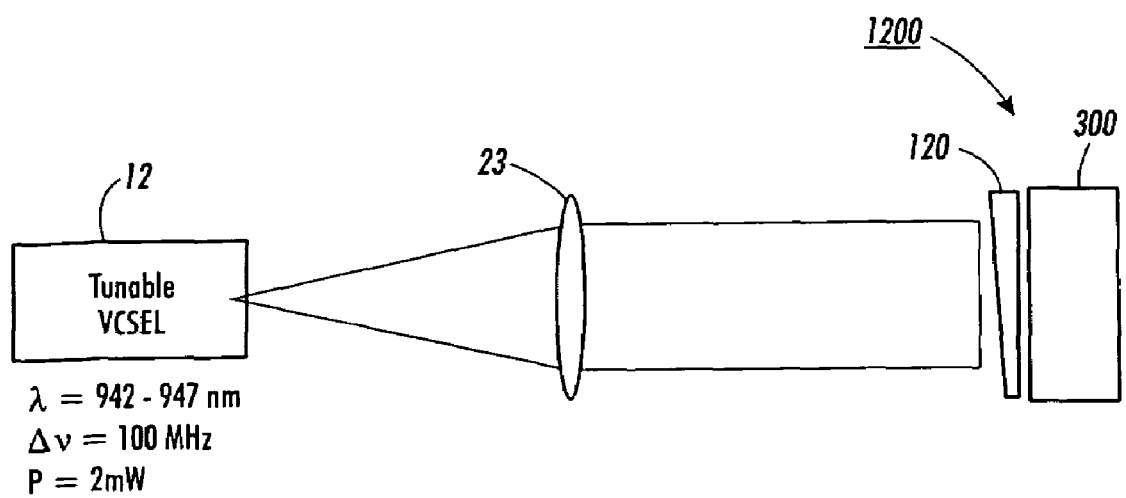
FIG. 12 is a schematic diagram of a setup for calibrating a chip-size wavelength detector and spectrometer according to this invention.

FIG. 12 shows an arrangement which can be used to calibrate or test a chip-size wavelength detector 1200, or to measure the wavelength of a single frequency source. To calibrate a high-resolution chip-size wavelength detector 1200, the chip-size wavelength detector 1200 shown in FIG. 8 may be illuminated by a collimated, single-frequency laser source 12, as shown in FIG. 12. The single frequency laser source 12 may be a semiconductor vertical cavity surface emitting laser (VCSEL), which is tunable between about 942 nm and 947 nm, by adjusting the operating temperature of the semiconductor device. The linewidth of the single frequency laser source 12 is about 100 MHz, and the output power is about 2 mW. The output of the single-frequency laser source 12 is collimated by a collimating lens 23. For clarity, the wedge-shaped etalon 120 is shown schematically only as the wedge-shaped element 120, however it should be clear that the other components of the wedge-shaped etalon 120 shown in greater detail in FIG. 8 are also present.

Furthermore, although the setup shown in FIG. 12 is described in terms of a calibration operation, it should be clear to one skilled in the art that the exact same setup can be used to measure the wavelength generated by the source 12.

Because the wedged etalon 120 may be fabricated directly on a detector mounted in an integrated circuit-type housing, it is straightforward to integrate these devices into more complex electronic detection systems. For example, the chip-size wavelength detector 1200 may easily allow the creation of an interactive detection system, wherein the results of the spectral analysis is used to then alter the properties or performance of the source 12. Also, subsequent or adjacent position-sensitive detectors may trigger other events occurring within the detection system.

Figure 13A:
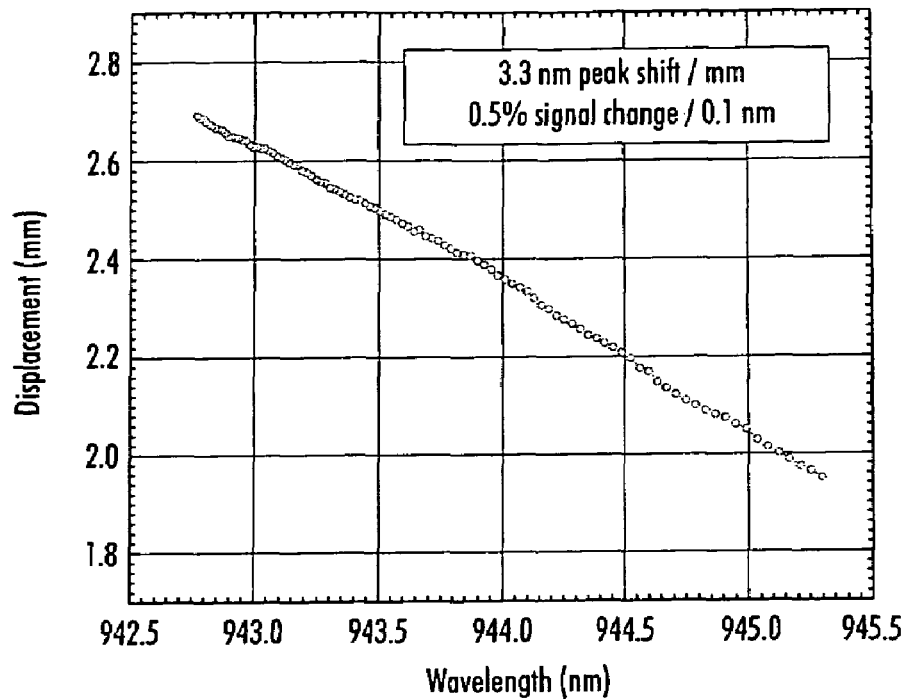
FIG. 13a shows the displacement versus wavelength curve of the wavelength detector in response to the tuning of the single frequency VCSEL source.

FIG. 13a shows the differential output of electrode 334 as compared to electrode 332 (see FIG. 11), normalized by the sum of the currents, for the chip-size wavelength detector 1200. The differential output signal can be defined as:

$$I_L - I_R / (I_L + I_R) \quad (3)$$

where $I_L$ is the current flowing between electrode 334 and electrode 333, and $I_R$ is the current flowing between electrode 332 and electrode 333. The differential output is shown to be approximately linear throughout the range from about 942.75 nm to about 945.25 nm. The total wavelength range measured was 2.5 nm, spanning a detector surface length of 0.76 mm, such that a 3.3 nm shift in the peak wavelength caused a shift in the location of the detected spot 338 by about 1 mm. Since the position sensitivity of the position-sensitive detector 300 is better than about 0.1 μm, the sensitivity of this wavelength detector 1200 to wavelength shifts is about $0.33 \times 10^{-3}$ nm. The relationship between displacement and wavelength, shown in FIG. 13a, constitutes the calibration curve for the chip-size wavelength detector 1200. Coatings or etalons with a peak wavelength shift of less than 1 nm can easily be fabricated. Therefore devices with an even better resolution ($<10^{-4}$ nm) are possible.

Figure 13B:
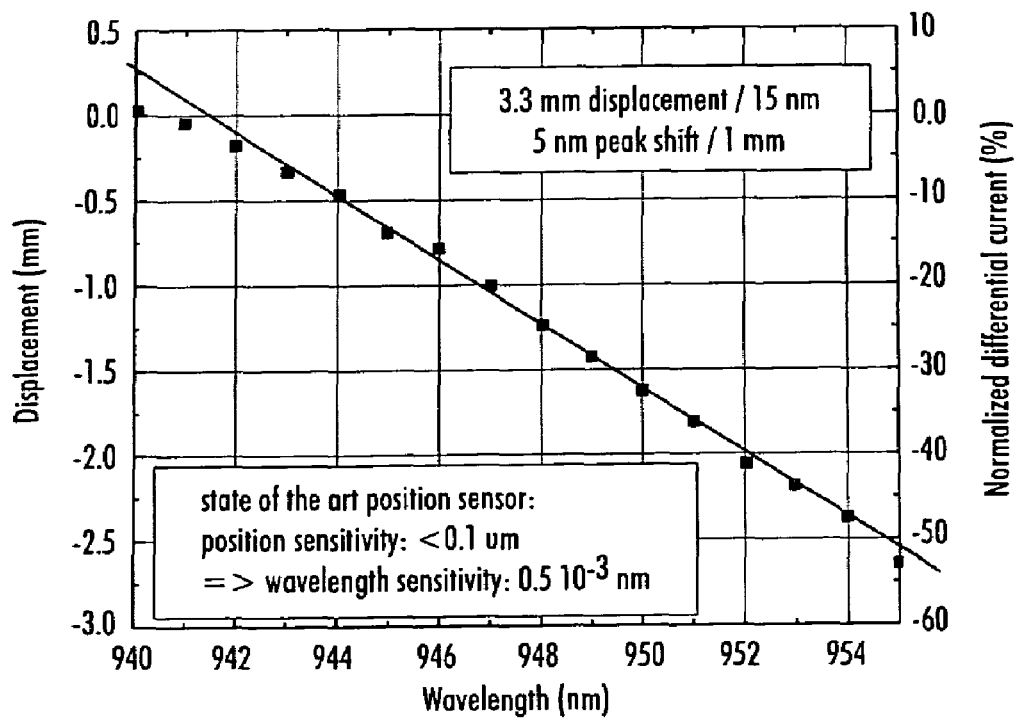
FIG. 13b shows the displacement versus wavelength curve of the wavelength detector in response to light from a halogen lamp spectrally filtered by a monochromator.

For low-resolution coatings the calibration can also be done with a monochromator instead of the VCSEL. For example, FIG. 13b shows the relationship between displacement and wavelength for a halogen lamp spectrally filtered by a monochromator. Because the monochromator is more widely tunable than the VCSEL, the relationship between displacement and wavelength is shown to be linear over a wider range. This suggests that high resolution measurements as described above can be performed over a very broad spectral range.

Because the detector 300 can also, in theory, measure intensity independently from wavelength, by monitoring the sum of the currents $I_L$ and $I_R$, the wavelength detector 1200 may also be capable of generating spectra of multi-colored sources such as plasmas, filtered through a monochromator.

Since the position-sensitive detector 300 is capable of measuring shifts in the position of the light spot to less than about 0.1 μm, it is capable of measuring wavelength shifts in the range of less than about $1 \times 10^{-4}$ nm, despite using very simple and inexpensive technology. Being relatively independent of light intensity also relieves this embodiment of the requirement of careful gain calibration of the detector response, although each chip-size wavelength detector 1200 will still, in general, need to be wavelength calibrated using a known light source, as discussed above. Note that the precise determination of a wavelength shift is possible even without accurate calibration.

Figure 1:
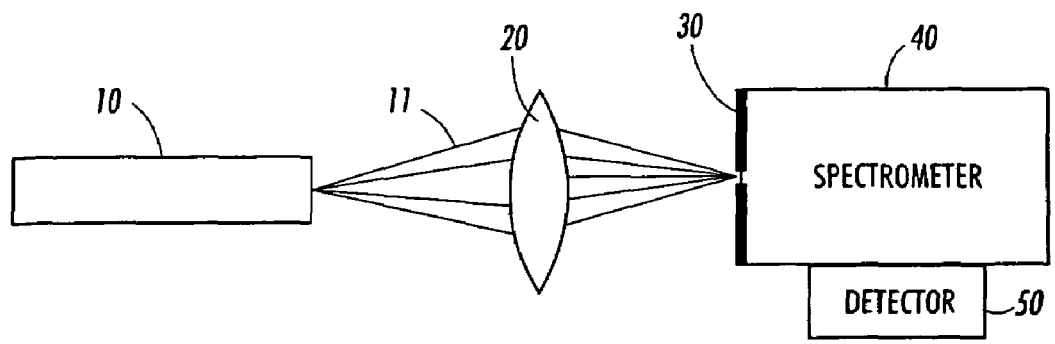
FIG. 1 is a schematic diagram of a known spectrometer apparatus.

A calibration curve, such as that shown in FIGS. 13a and 13b, relates the displacement of the light spot on the position-sensitive detector to a wavelength shift of the incoming light. The calibration curve is primarily associated with the details of the films comprising the wedge-shaped etalon 120 on detector 300 of the chip-size wavelength detector 1200. Unlike conventional spectrometers, the wedge-shaped etalon 120 is rigidly adhered to the detector 300, and cannot, in general, be dislodged by vibration or impact. Therefore, unlike full-size grating-based or prism-based spectrometers such as that shown in FIGS. 1 and 2, the calibration curve is not expected to change with external conditions such as the orientation of the chip-size wavelength detector 1200, shock or vibration, and need not be repeated unless an event occurs which changes the physical condition of the wedge-shaped etalon 120, such as extreme temperatures.

With calibration curves such as those shown in FIGS. 13a and 13b, the wavelength detector may be capable of measuring absolute wavelengths, as well as wavelength shifts, to high accuracy. However, the calibration of the device in terms of absolute wavelength measurement may be affected by changes in temperature. In the event that temperature extremes are experienced by the wavelength detector 1200, a temperature sensor may be integrated with the wavelength detector 1200, allowing the wavelength detector 1200 to be calibrated for a number of temperatures. Calibrations as a function of temperature may then be stored as a lookup table, to correct the output of the wavelength detector for any of a number of different operating temperatures. Alternatively, the chip-size wavelength detector may be temperature-stabilized, for example using a thermoelectric cooler such as those used to stabilize the output of diode lasers.

Figure 2:
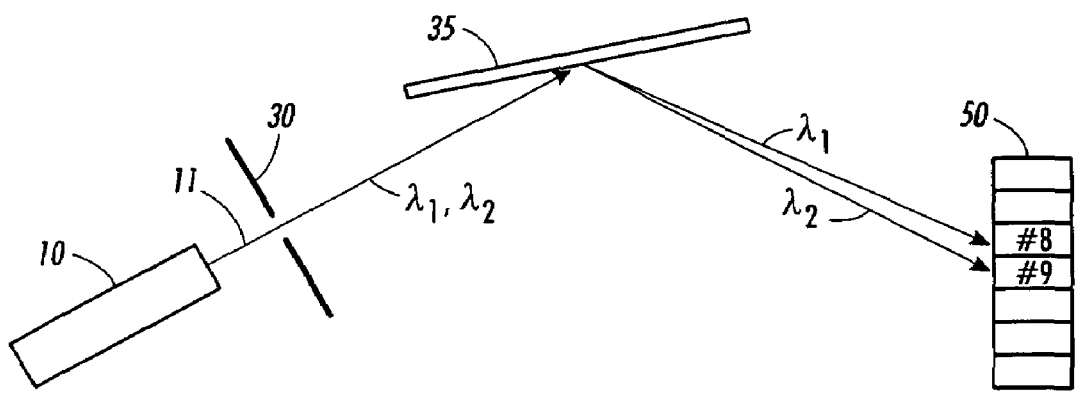
FIG. 2 is a schematic diagram of the elements of the known spectrometer apparatus of FIG. 1.
Figure 3:
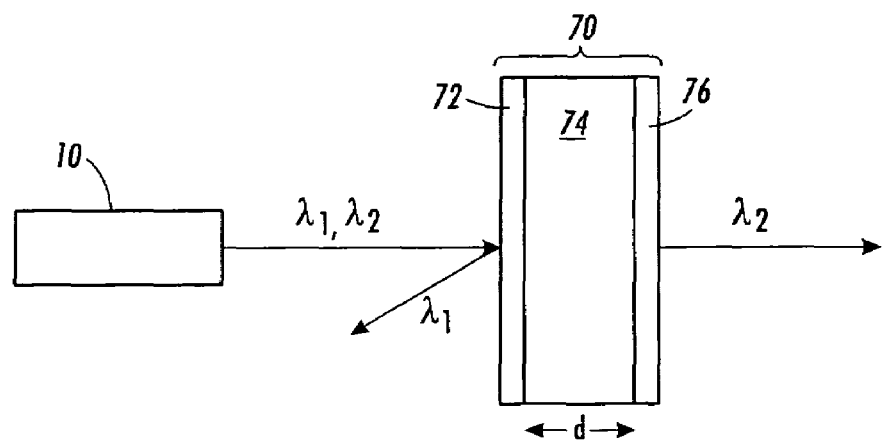
FIG. 3 is a diagram of a known Fabry-Perot etalon.
Figure 4:
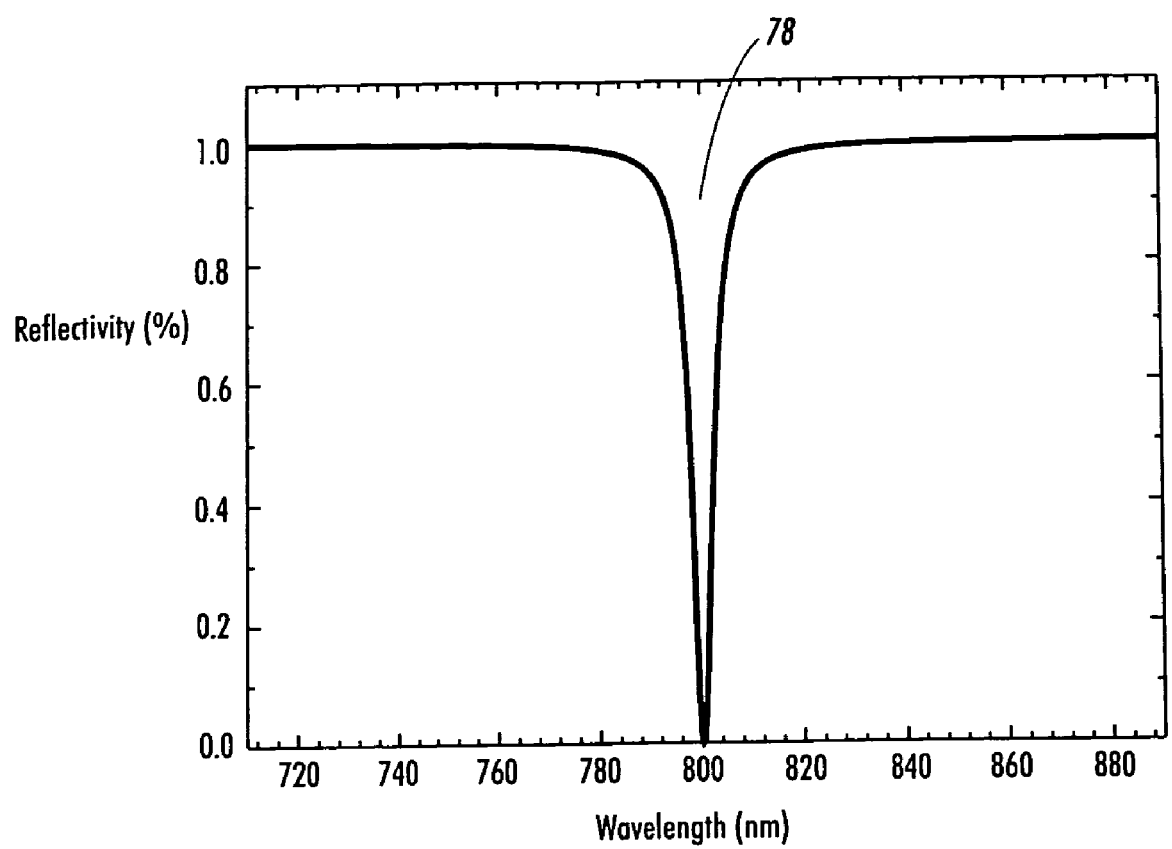
FIG. 4 is a reflectivity spectrum of the Fabry-Perot etalon of FIG. 3.

This type of operation is in contrast to calibration procedures for conventional full-size spectrometers, which must be repeated frequently to assure that the calibration has not changed as a result of a relative movement between the optical elements shown in FIG. 2. Furthermore, the chip-size wavelength detector 1200 may be deployed in any range of operating environments, without needing to recalibrate the device. For example, the chip-size wavelength detector would be expected to perform similarly whether in an evacuated environment such as outer space, as in an environment with a different ambient index of refraction, such as submerged underwater. In either situation, the response of the chip-size wavelength shift detector would not be expected to change, unlike conventional spectrometers, which rely on refracting prisms or diffraction gratings, which inherently depend on the index of refraction of the medium in which they are operating.

Figure 14:
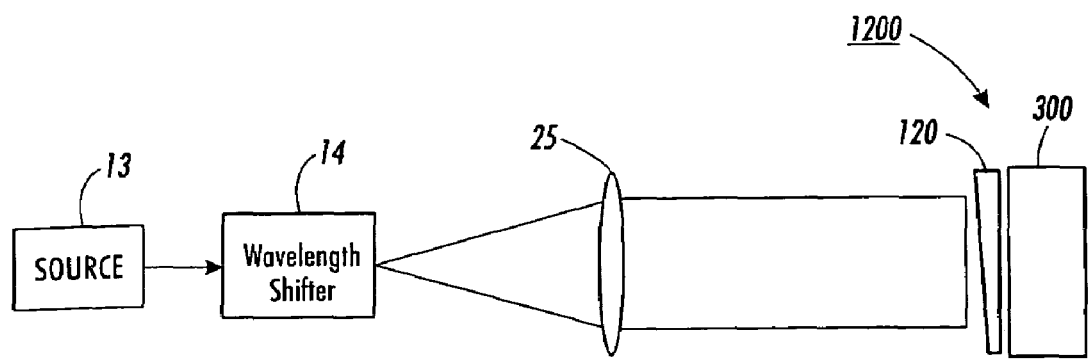
FIG. 14 is a schematic diagram of an experimental setup using a chip-size wavelength detector according to this invention.

Having calibrated the chip-size wavelength detector 1200, for example with the setup shown in FIG. 12, the chip-size wavelength detector 1200 can be used, for example, to measure an unknown wavelength shift. Such an experimental arrangement is shown in FIG. 14. In this experimental arrangement, a single frequency source 13 is transmitted through a wavelength shifting mechanism 14, which shifts the wavelength of the light by some unknown amount. One such example of a wavelength shifting mechanism is the shifting of the wavelength of a laser as a result of temperature or changes in the dimensions of a laser cavity. The chip-size wavelength detector 1200 is disposed to measure the wavelength of the single frequency source 13, before and after the wavelength shift mechanism is switched on and off.

Figure 15:
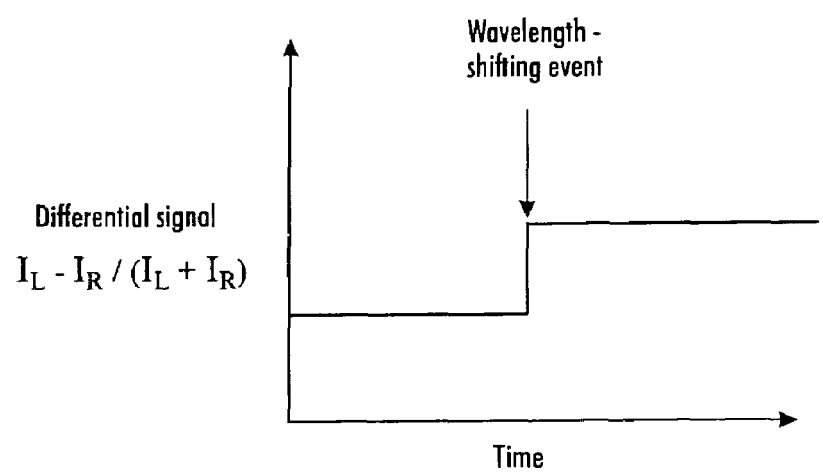
FIG. 15 is a sample output of the wavelength detector in response to a wavelength-shifting event.

FIG. 15 shows schematically the results of measuring the effects of imposing a wavelength shift event, such as, for example, changing the output of a thermoelectric cooler implemented to tune the frequency of a single-mode semiconductor laser. Before the wavelength shifting event, a particular wavelength is observed, as the position-sensitive detector 300 measures nominal position of a light spot transmitted through the wedge-shaped etalon 120 from source 13. After wavelength shifting event is triggered, the position-sensitive detector 300 measures a different position corresponding to the shift of the wavelength of the light source 13 away from its original value. By measuring the difference in displacement of the two light spots on the detector 300, the wavelength shift of the light producing the two light spots is determined.

Figure 16:
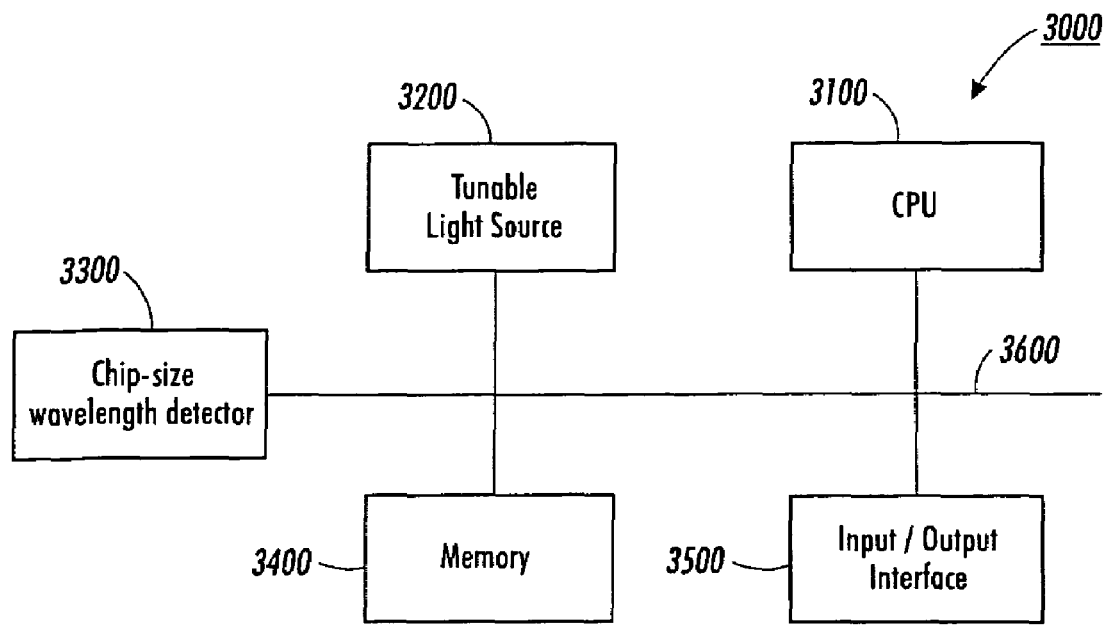
FIG. 16 illustrates an exemplary calibration system using the exemplary chip-size wavelength detector.

FIG. 16 shows a system 3000 capable of calibrating a chip-size wavelength detector 3300, such as those shown in FIG. 5, 8, or 11. According to FIG. 16, the system 3000 may include a CPU 3100, a tunable light source 3210, a chip-size wavelength detector 3300, a memory 3400, and an input/output interface 3500. The above components may be coupled together, for example, via a bus 3600. While the measurement system 3000 is illustrated using a bus architecture diagram, any other type of hardware and/or software configuration may be used. For example, application specific integrated circuits (ASICs) may be used to implement one or more of the components, or a computer program that executes in the CPU 3100 to perform one or more of the functions of the calibration system 3000.

To perform the calibration step, the tunable light source 3210 may have its output tuned by the CPU 3100, while the CPU 3100 also acquires data from the chip-size wavelength detector 3300. The data is acquired by taking the differential signal from the position sensor 300 of the chip-size wavelength detector 3300. The CPU 3100 stores the acquired data in memory 3400. By using a calibrated light source, the CPU can measure the relationship between displacement on the position-sensitive detector 300 and wavelength, and store this relationship in memory 3400. In addition, by monitoring the output power of the light source, the CPU can measure a gain coefficient for the position-sensitive detector, and store the gain coefficient also in memory 3400. This gain coefficient may be used to calibrate the output of the position-sensitive detector, in the event that an intensity measurement is made, as described above, by calculating the sum of the currents $I_R$ and $I_L$.

Figure 17:
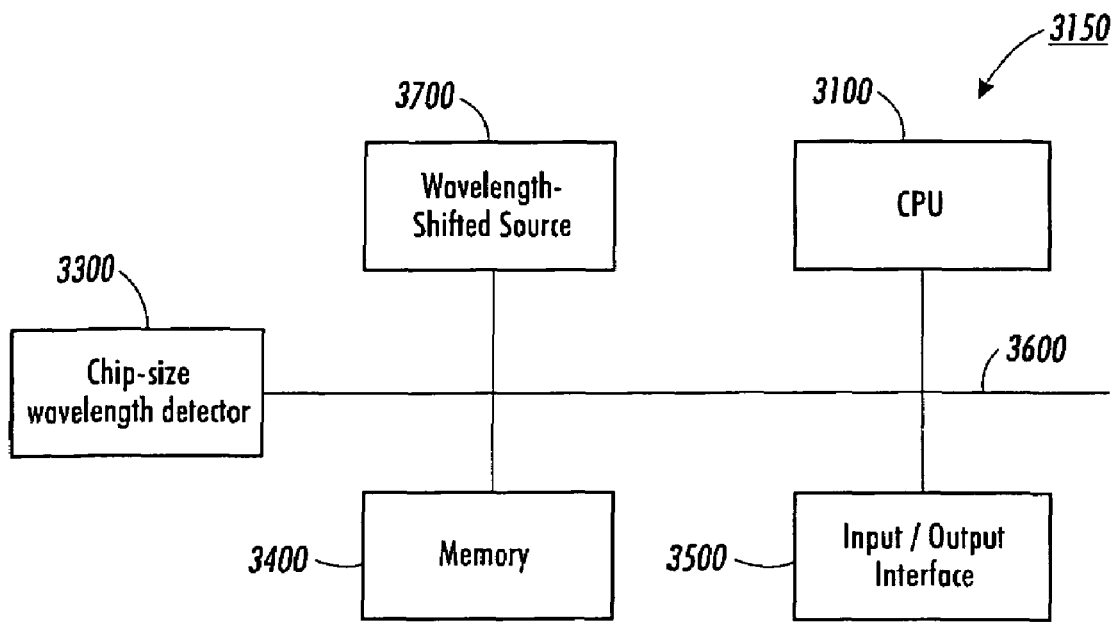
FIG. 17 illustrates an exemplary system for measuring the wavelength shift of a wavelength-shifted source using the exemplary chip-size wavelength detector.

Having calibrated the chip-size wavelength detector 3300, the tunable light source 3210 may be substituted with a wavelength-shifted light source 3700, in the experimental arrangement 3150 shown in FIG. 17, to perform the measurement step. As before, the CPU 3100 queries the wavelength detector 3300 for the position of the unshifted light spot on the wavelength detector 3300. The CPU stores this value in memory 3400. The wavelength shifting mechanism is then applied to the wavelength-shifted light source 3700, and the CPU again queries the chip-size wavelength detector 3300 for the position of the shifted light spot. The CPU compares the position of the unshifted light spot with the wavelength-shifted light spot, to determine a displacement between the light spots. Then, using the stored relationship between displacement and wavelength, the wavelength shift of the wavelength-shifted source may be determined.

While this invention has been described in conjunction with the exemplary embodiments outlined above, various alternatives, modifications, variations, improvements, and/or substantial equivalents, whether known or that are or may be presently unforeseen, may become apparent upon reviewing the foregoing disclosure. Accordingly, the exemplary embodiments of the invention, as set forth above, are intended to be illustrative, not limiting. Various changes may be made without departing from the spirit and scope of the invention.

What is claimed is:

1. An apparatus for measuring a wavelength of light from a light source, comprising:
   a position-sensitive detector;
   at least one film with a laterally varying transmission property, which transmits the light to the position-sensitive detector;
   a memory for storing a calibration curve for the position-sensitive detector with the at least one film; and
   a CPU which measures a position of a light spot transmitted through the at least one film and incident on the position-sensitive detector, and determines a wavelength based on the measured position using the stored calibration curve.

2. A method of using position-sensitive detectors to measure wavelength of light from a light source, comprising:
   measuring a calibration curve for a film with laterally varying transmission properties, transmitting the light to a position-sensitive detector, the calibration curve relating a wavelength of light to a position of a light spot on the position-sensitive detector, transmitted through the laterally varying film;
   measuring a position of a light spot on a position-sensitive detector; and
   determining the wavelength of the light in the light spot based on the calibration curve.

3. The method of claim 2, wherein measuring a calibration curve further comprises:
   sweeping a known wavelength of an input light source;
   measuring a movement of a spot transmitted through the film, and impinging on the position-sensitive detector, as a function of the known wavelength.

4. The method of claim 3, further comprising:
   storing data indicative of a position of a spot transmitted through the film as a function of wavelength of the input light source.

5. A method of using position-sensitive detectors to measure wavelength shift of light from a light source, comprising:
   measuring a position of a first spot of light having a first wavelength on a position-sensitive detector;
   measuring a position of a second spot of light having a second wavelength on the position-sensitive detector;
   determining the distance between the first light spot and the second light spot; and
   determining a wavelength shift between the first wavelength and the second wavelength, based on the determined distance.

6. The method of claim 5, further comprising:
   relating the position of the first spot to the first wavelength using a calibration curve; and
   relating the position of the second spot to the second wavelength using the calibration curve.

7. The method of claim 6, further comprising:
   determining the wavelength shift between the first wavelength and the second wavelength, based on the calibration curve.

8. An apparatus for measuring a wavelength of a light source, comprising:
   a chip-size wavelength detector including a laterally varying transmissive film and a position-sensitive detector;
   a memory for storing a calibration curve for the chip-size wavelength detector;
   a CPU which measures a position of a light spot transmitted through the laterally varying transmissive film and incident on the position-sensitive detector, and determines a wavelength based on the measured position using the stored calibration curve.

9. The apparatus of claim 8, wherein the calibration curve is measured by detecting a change in a position of a spot of light on the position-sensitive detector as a function of a wavelength of light emitted from a tunable source.

10. Apparatus for measuring wavelength of light from light sources, comprising:
a position-sensitive detector having three or more terminals and a detection surface; and
a film component that includes at least one film, the film component having a laterally varying optical thickness as a result of at least one of laterally varying thickness and laterally varying refractive index so that, in response to a wavelength of light received from a light source, the film component transmits the wavelength of light and provides a respective light spot on the position-sensitive detector;
the position-sensitive detector's detection surface being between at least two of the terminals so that, in response to the wavelength's light spot, the position-sensitive detector provides a differential output between its terminals, the differential output indicating position of the light spot on the detection surface of the position-sensitive detector, the position indicating the wavelength of the received light.

11. Apparatus for measuring wavelength shifts of light from light sources, comprising:
a position-sensitive detector having three or more terminals and a detection surface;
a film component that includes at least one film, the film component having a laterally varying optical thickness as a result of at least one of laterally varying thickness and laterally varying refractive index so that, in response to a shifting wavelength of light received from a light source, the film component transmits the shifting wavelength of light and provides a respective shifting light spot on the position-sensitive detector; the position-sensitive detector's detection surface being between at least two of the terminals so that, in response to the wavelength's shifting light spot, the position-sensitive detector provides differential output signals between its terminals, the differential output signals indicating positions of the light spot on the detection surface of the position-sensitive detector; and
circuitry connected to receive the differential output signals, the circuitry being structured so that it uses the differential output signals to determine a distance between first and second locations of the shifting light spot and uses the determined distance to measure a shift of the shifting wavelength.

12. The apparatus of claim 11, further comprising:
a lens that projects the light transmitted through the film component on the position-sensitive detector.

13. The apparatus of claim 11, wherein the film component is located adjacent to the position-sensitive detector.

14. The apparatus of claim 11, wherein the film component comprises a wedge-shaped etalon including a wedge-shaped cavity and at least one reflector, the etalon being located adjacent to the position-sensitive detector.

15. The apparatus of claim 14, wherein the at least one reflector comprises a Bragg reflector, including pairs of alternating layers of material, wherein within each pair, each layer of material has a different index of refraction than the other layer.

16. The apparatus of claim 15, wherein the alternating layers of materials comprise at least one of $SiO_2$, $TiO_2$, AlAs, GaAs, $Al_2O_3$, $Ta_2O_5$, GaN and AlGaN.

17. The apparatus of claim 15, wherein each alternating layer of material has a thickness that is about ¼ of the wavelength of the light divided by the index of refraction of the material of the layer.

18. The apparatus of claim 14, wherein the wedge-shaped cavity defines a wedge angle of less than about 0.10 degrees.

19. The apparatus of claim 11, wherein the film component comprises a film having a laterally graded index of refraction.

20. The apparatus of claim 11, wherein the position-sensitive detector comprises a three-terminal semiconductor junction.

21. The apparatus of claim 6, wherein the position-sensitive detector generates the differential output signals between two of the three terminals.

22. The apparatus of claim 21, wherein the differential output signals are proportional to a location of a light spot on the detection surface between two terminals of the position-sensitive detector.

23. The apparatus of claim 20, wherein one terminal comprises an N-doped bias layer, and the other two terminals comprise separate locations on a P-doped layer.

24. The apparatus of claim 11, wherein:
the position-sensitive detector comprises a five-terminal semiconductor junction that determines the position of a light spot in two dimensions; and wherein
the optical thickness of the film component varies laterally in two dimensions.

25. A system comprising:
a single frequency light source that provides light with a shifting wavelength;
a chip-size detector that includes:
a position-sensitive detector having three or more terminals and a detection surface; and
a film component that includes at least one film, the film component including an optically transmissive cavity with a laterally varying optical thickness resulting from at least one of laterally varying thickness and laterally varying index of refraction so that, in response to the shifting wavelength from the light source, the film component transmits the shifting wavelength of light and provides a light spot on the position-sensitive detector, a shift in the shifting wavelength causing a respective shift in the light spot's position on the position-sensitive detector, with the wavelength shift to position shift ratio being less than about 6 nanometers/millimeter;
the position-sensitive detector's detection surface being between at least two of the terminals so that, in response to the light spot, the position-sensitive detector provides an analog differential output between its terminals, the analog differential output being capable of indicating shifts in position of the light spot on the detection surface of the position-sensitive detector down to less than about 0.1 microns;
memory storing calibration curve data to be used with the chip-size detector; and
a CPU connected to access the memory and to receive input signals based on the analog differential output; the CPU being programmed to use the input signals and the calibration data to measure at least one of wavelength and wavelength shift.

* * * * *